(12) United States Patent  
Eschbach et al.

(10) Patent No.: US 9,258,452 B1  
(45) Date of Patent: Feb. 9, 2016

(54) ALTERING SCANS TO INCLUDE SECURITY FEATURES IDENTIFYING SCAN ORIGINATION

(71) Applicant: Xerox Corporation, Norwalk, CT (US)

(72) Inventors: Reiner Eschbach, Webster, NY (US); Safwan R. Wshah, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/531,031

(22) Filed: Nov. 3, 2014

(51) Int. Cl.
*H04N 1/32* (2006.01)
*G06T 1/00* (2006.01)

(52) U.S. Cl.
CPC ............ *H04N 1/32336* (2013.01); *G06T 1/005* (2013.01); *H04N 1/32267* (2013.01); *H04N 1/32352* (2013.01); *G06T 2201/0064* (2013.01); *G06T 2201/0065* (2013.01); *H04N 2201/325* (2013.01); *H04N 2201/3252* (2013.01); *H04N 2201/3269* (2013.01)

(58) Field of Classification Search
CPC .. B42D 25/00; G06F 21/608; G06K 9/00577; G06K 15/02; G06K 15/181; G06K 15/1831; B41M 3/14; B41M 3/146; G03H 1/0011; G03H 1/041; G03H 2001/048; G03H 2001/0482; H04N 1/405; H04N 1/52; H04N 2201/325; H04N 2201/3252; H04N 2201/3269; H04N 1/32267; H04N 1/32352; H04N 1/32336; G06T 2201/0064; G06T 2201/0065; G06T 1/005

USPC ........................... 358/3.26, 3.28, 1.15
See application file for complete search history.

(56) References Cited

U.S. PATENT DOCUMENTS

| | | | |
|---|---|---|---|
| 5,565,994 | A | 10/1996 | Eschbach |
| 6,806,983 | B2 | 10/2004 | Long |
| 6,988,665 | B2 | 1/2006 | Schofield |
| 7,196,822 | B2 | 3/2007 | Hu |
| 7,965,422 | B2 | 6/2011 | Hains et al. |
| 8,156,416 | B2 | 4/2012 | St. Jacques, Jr. et al. |
| 8,770,627 | B2 | 7/2014 | Beretta |
| 8,798,328 | B2 | 8/2014 | Simske et al. |
| 2006/0279769 | A1 | 12/2006 | Ludwig et al. |
| 2009/0279143 | A1* | 11/2009 | St. Jacques et al. ......... 358/3.28 |
| 2012/0263343 | A1* | 10/2012 | Simske et al. ............... 382/100 |

* cited by examiner

*Primary Examiner* — Iriana Cruz
(74) *Attorney, Agent, or Firm* — Gibb & Riley, LLC

(57) ABSTRACT

Systems and methods scan a previously printed sheet using a scanner to create an original scan, and evaluate the original scan to identify marks printed on the printed sheet. For example, any marks, such as the straight and curved marks located in separation areas (areas separating data areas of the printed sheet) of the printed sheet can be evaluated using a specialized image processor. Then, these systems and methods alter the pixels of such marks to add security features (e.g., microtext, microprinting, etc.) to the marks that identify the time, place, and user of the scanner, and this process produces an altered scan. Rather than outputting the original scan, these systems and methods instead substitute the altered scan in place of the original scan and, therefore, output the altered scan from the image processor in place of the original scan.

20 Claims, 9 Drawing Sheets

ALTERING SCANS TO INCLUDE SECURITY FEATURES IDENTIFYING SCAN ORIGINATION

BACKGROUND

Systems and methods herein generally relate to scanning of sheets to produce scanned images, and more particularly to the processing of such scanned images with respect to security features.

Copying of proprietary data is a major problem for companies of all sizes. This ranges from the "almost harmless" pricelist copying, to the security of internal intellectual property or data of the government and military. For this reason, it is useful to deter people from improper copying. Deterrent is the preferred situation, since a crime that was never committed is largely preferred to a crime where the perpetrator was discovered and punished after the damage was done. In colloquial language, this is best stated as "an ounce of prevention is worth a pound of cure."

SUMMARY

Various methods herein begin when they receive a user login to a scanner or Multi/Function Device (MFD). After the user logs in, a previously printed sheet is scanned using the scanner to create an original scan. Such methods evaluate the original scan to identify marks printed on the printed sheet. For example, any marks, such as the straight and curved marks located in separation areas (areas separating data areas of the printed sheet, such as areas separating text, graphics and/or images) of the printed sheet can be evaluated using a specialized image processor. Here, the term "original scan" indicates the first scan performed of the original source document.

Then, these methods alter the pixels of such marks to add security features (e.g., microtext, microprinting, etc.) to the marks that identify the time, scanner, location, user of the scanner (potentially based on the user login) and/or other available meta-data and this process (that is again performed using the specialized image processor) produces an altered scan. The time, scanner identification, location, meta-data, and/or user identification within the security features usually requires magnification equipment to be viewed, and is generally not observable by a user lacking such magnification equipment. Therefore, the process of altering the pixels of the marks does not change the appearance of the marks to the user lacking such magnification equipment.

Rather than outputting the original scan, these methods instead delete the original scan and substitute the altered scan in place of the original scan and, therefore, only output the altered scan from the image processor (in place of the original scan). This altered scan exhibits unobtrusive modifications, which, to a general user lacking magnification equipment, will create a print or representation that is visually equivalent to the original scan to the unaided eye.

Various system herein include, among other components, a scanner scanning a previously printed sheet to create an original scan, and a specialized image processor operatively (meaning directly or indirectly) connected to the scanner. The specialized image processor evaluates the original scan to identify marks printed on the printed sheet in the separation areas of the printed sheet. The specialized image processor alters pixels of the marks to add security features (identifying the time, scanner, location, and/or user of the scanner) to the marks to produce an altered scan. Again, the scanner receives a user login prior to the scanning, and the specialized image processor can use the user login to add the security features that identify the user of the scanner.

The time, place, and user of the scanner within the security features (e.g., microtext, microprinting, etc.) require magnification equipment to be viewed and are not observable by a user lacking the magnification equipment. Thus, again, the process of altering the pixels of the marks does not change the appearance of the marks to the user lacking the magnification equipment.

The specialized image processor deletes the original scan and substitutes the altered scan in place of the original scan. The image processor thus outputs the altered scan in place of the original scan. These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, it is useful to deter people from improper copying. Systems and methods herein deter unauthorized copying by indicating that the document is (a) secure and (b) that there is a high likelihood that any improper copying will be tracked. This deterrence has two components, one "unobtrusive" but visible and one "forensic" and invisible. The systems and methods herein provide fine delineation element document components that only serve to delineate or group other elements and to replace them unobtrusively with security elements that still perform the functions of delineation and grouping.

Figure 1:
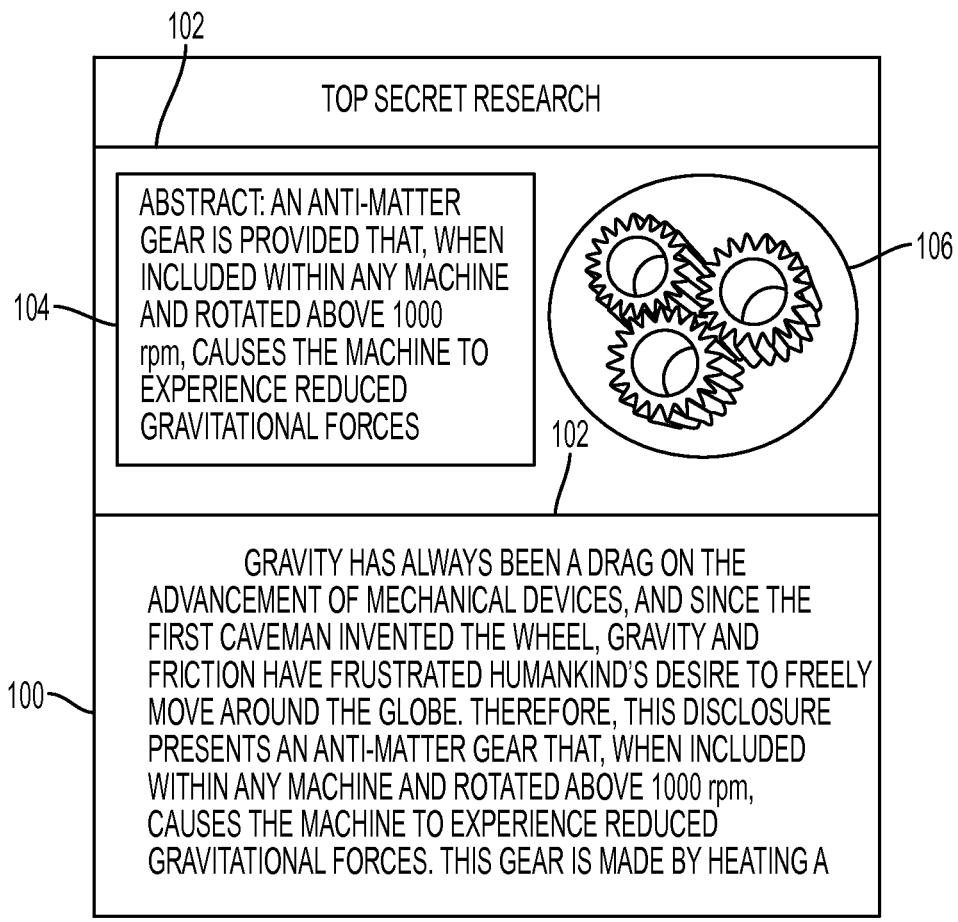
FIG. 1 is a schematic diagram illustrating a scanned image produced by systems and methods herein.

For purposes herein, printed elements in separation areas are "non-relevant" if they do not carry any information or data. As shown in FIG. 1, a typical non-relevant element in the separation areas can be horizontal or vertical lines 102 crossing the entire page, or a large box 104 or circle 106 surrounding text or an image area. The distinction between data and non-data can be ambiguous, but for the purpose of this disclosure it should be understood that even when a data element is substituted in the altered scan, the overall information is not destroyed since the security element will look just like the data element to the unaided eye.

Therefore, as shown in exemplary FIG. 1, a previously printed sheet is scanned using a scanner to create an original scan 100 (an electronic document that is a digital representation of the previously printed sheet). Such methods evaluate the original scan 100 to identify marks 102, 104, 106 printed on the printed sheet that can be revised to include security features identifying the origin of the scan. For example, any marks, such as the straight and curved marks 102, 104, 106 located in separation areas of the printed sheet can be evaluated using a specialized image processor. For purposes herein "separation areas" are portions of the electronic representation of the previously printed sheet that separate data areas from each other, and the "data areas" contain text, graphics, images, and/or other content for example. Thus, in FIG. 1, the text and the gear image are located in "data areas" of the electronic representation of the previously printed sheet 100, and lines 102, 104, and 106 are located in "separation areas" of the electronic representation of the previously printed sheet 100.

While practically any mark on the sheet could be utilized as a security feature, the methods and systems herein automatically identify marks that are connected components, are a single, consistent color, and are of a certain size (length, width, thickness, etc.) that allows them to be altered with security features, without the alterations being readily apparent to a viewer who lacks magnification equipment. For example, lines, boxes, and circles generally utilize lines that are continuous and that have a consistent width and coloring, which makes such marks good candidates for microprinted security features. Therefore, the lines 102, box 104, and circle 106 are automatically selected as candidate lines for possible microprinting in this example because they have consistent width, and a width that works well for microprinting (e.g., that is between a predetermined minimum and maximum width for a given type of security feature). Those skilled in the art would understand that specific width minimums and maximums of candidate marks will vary depending upon the nature and size of the security feature being added, and that the claims set forth in this disclosure encompass all such sizes and all such types of security features.

The user can set up any criteria for the selection of candidate marks to possibly be utilized as security features (e.g., to avoid common design elements or to assure that common design elements are found). One set up can, for example, automatically identify horizontal lines that are at least ⅓ of the page width to be candidate marks (non-relevant elements) or can identify curved lines or structures having horizontal and vertical lines (or any other criteria established by the user). Additionally, the lines can be limited to those having a certain minimum size (width or thickness). By automatically identifying the marks that will possibly be changed into security features, the systems and methods herein dynamically process each different scanned sheet differently to provide security features that are unique to each sheet, which avoids templates and other similar systems where the security features are manually established for each situation. With the systems and methods herein, the automated identification of the marks provides a broader application to all possible items that might be scanned, and produces more distinct (unique) security features because the security features are added to different locations in different scans.

Figure 2:
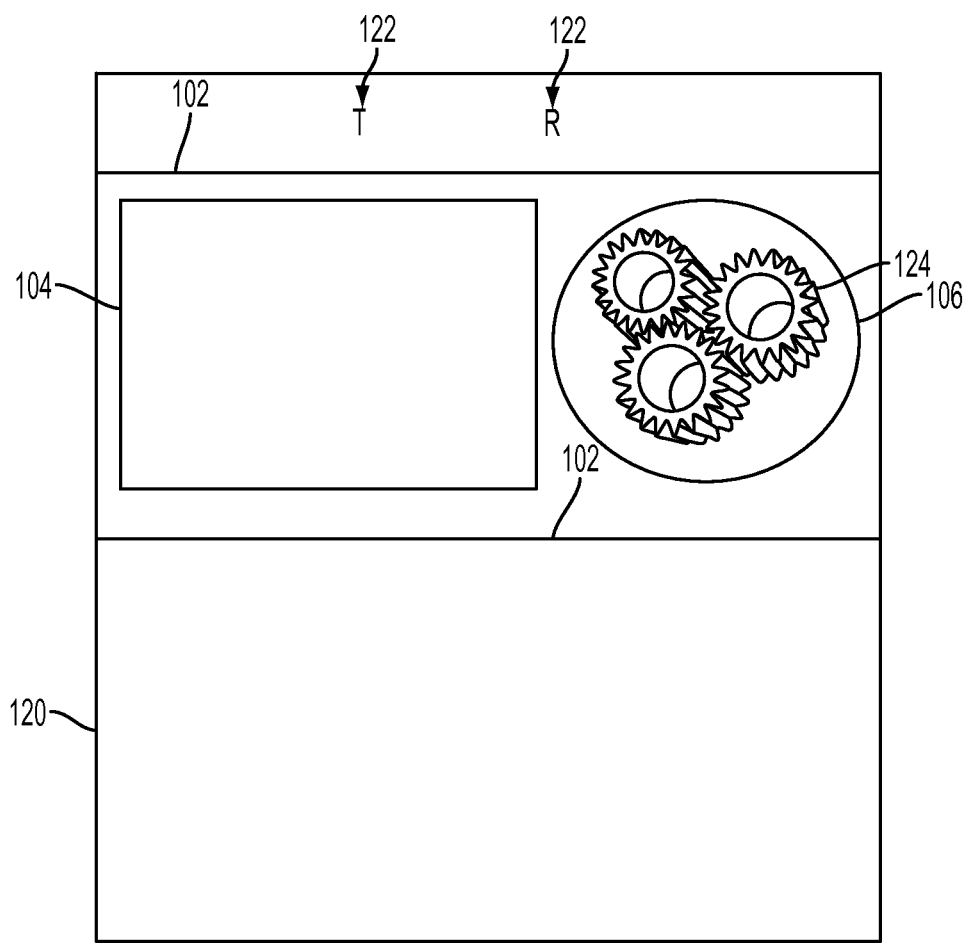
FIG. 2 is a schematic diagram illustrating a scanned image produced by systems and methods herein.

Also, as shown in FIG. 2, these elements are then further filtered to remove lines that produce a false-positive signal, such as items 122 and 124 (in this very simplified example, which may be oversimplified in some aspects, the unique criteria for the selection of candidate marks established by the user selected the items shown in FIG. 2, some of which may be errors). One exemplary filter that can be utilized is a histogram along the horizontal direction to assure that the item is really a line and not a letter 122 or any other uncommon graphical structure, such as the gears 124.

Once the marks that can be potentially used as security features (e.g. items 102, 104, 106) are identified, a subset of all candidate lines or marks can be selected to be converted into security features. In one example, it may be desirable to select only the "longest" line in a document for alteration with a security feature, or a line that has the best matching characteristics (length, width, color, etc.) for a given type of security feature.

Figure 3:
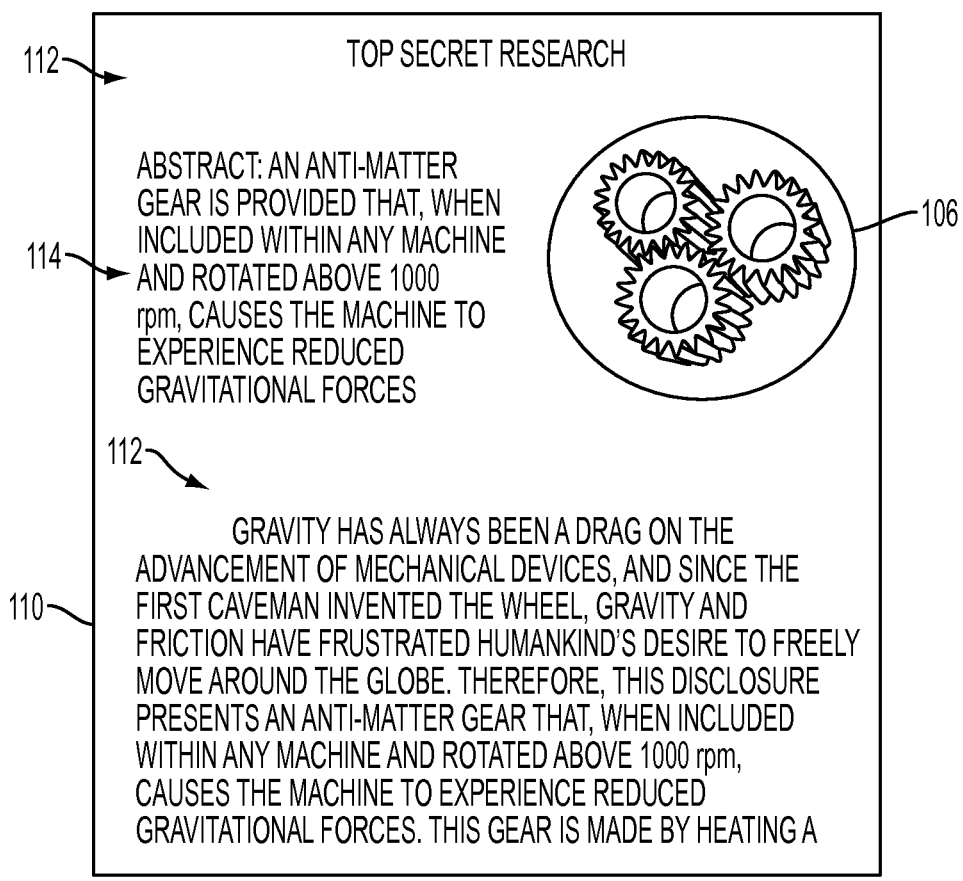
FIG. 3 is a schematic diagram illustrating a processed image produced by systems and methods herein.

Thus, some or all candidate marks or lines will be replaced with lines having security features (e.g. microtext, microprinting, microgloss, etc.). Therefore, lines 102 and 104 are shown as being removed from the separation areas 112, 114, in FIG. 3; while circle 106 is not selected for alteration with a security feature and remains in FIG. 3. Thus, the systems and methods herein "erase" the identified connected components 102 and 104 from the scan data and maintain information about the line parameters to permit the most appropriate security features to be utilized. In the example shown in FIG. 2, lines 102 and 104 will be replaced with micro-printed lines; however, those ordinarily skilled in the art would understand that less than such lines could be replaced depending upon the selection criteria used (e.g., one line, only horizontal lines, only vertical lines, only curved lines, etc.).

Figure 4:
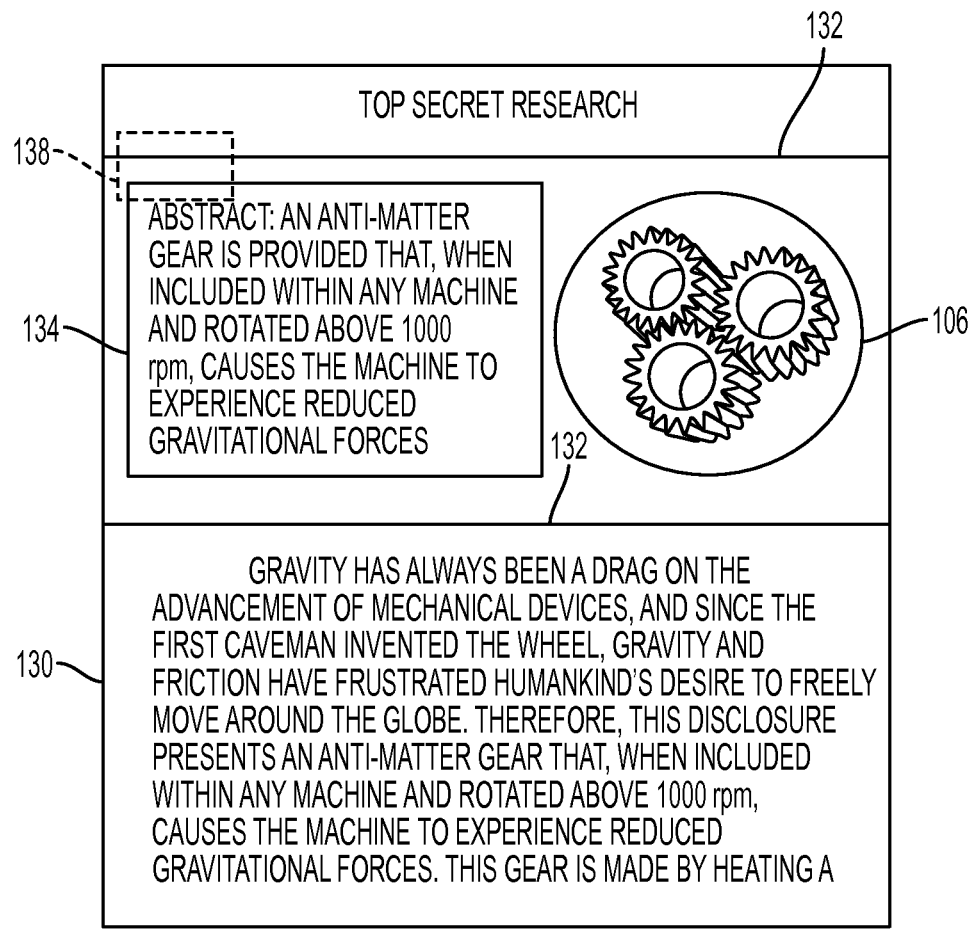
FIG. 4 is a schematic diagram illustrating a scanned image produced by systems and methods herein.
Figure 5:
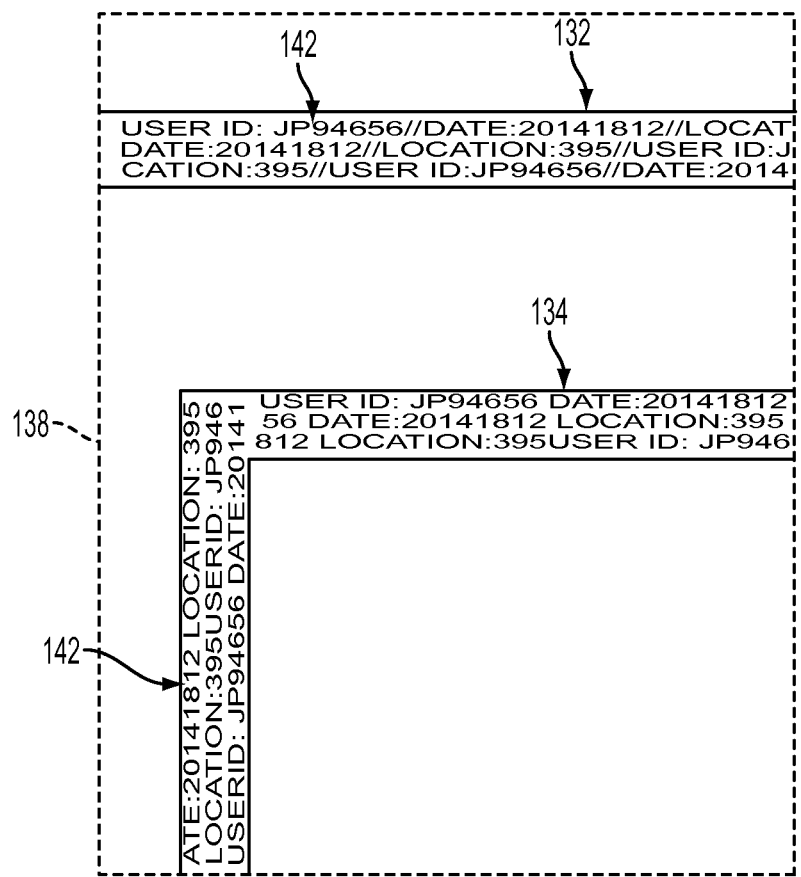
FIG. 5 is a schematic diagram illustrating a scanned image produced by systems and methods herein.

Thus, as shown in FIG. 4, an altered scan is produced with micro-printed lines 132 and 134. A small portion of FIG. 4, identified as area 138 is illustrated in magnified form in FIG. 5. As can be seen in FIG. 5, lines 132 and 134 are no longer solid lines, but instead, when they are magnified, microtext 142 can be seen. In this example, the microtext 142 identifies the user (e.g., User ID: JP94656) the date of the scan (e.g., Dec. 18, 2014; 20141812) and the location or scanner identification (e.g., Location: 395). Scanners and other similar equipment generally have unique identification and location information that they maintain. Further, scanners maintain a running clock to keep the current time/date, making such information available to be utilized during the microprinting. Less than this information, or more, may be utilized in the microprinted security feature. For example, the scanner identification could be included, or the user identification could be omitted; however, sufficient information to trace the time, location, etc., of the original scanning process is included to allow the source of the scan to be determined at any point in the future.

Figure 6:
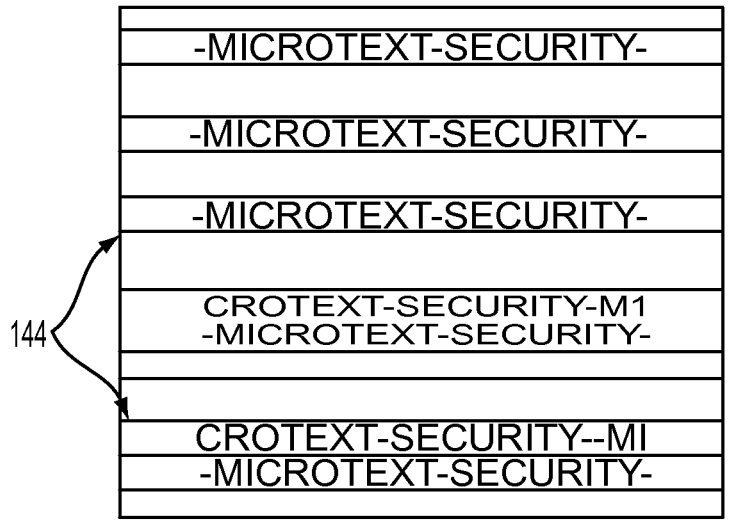
FIG. 6 is a schematic diagram illustrating a scanned image produced by systems and methods herein.
Figure 7:
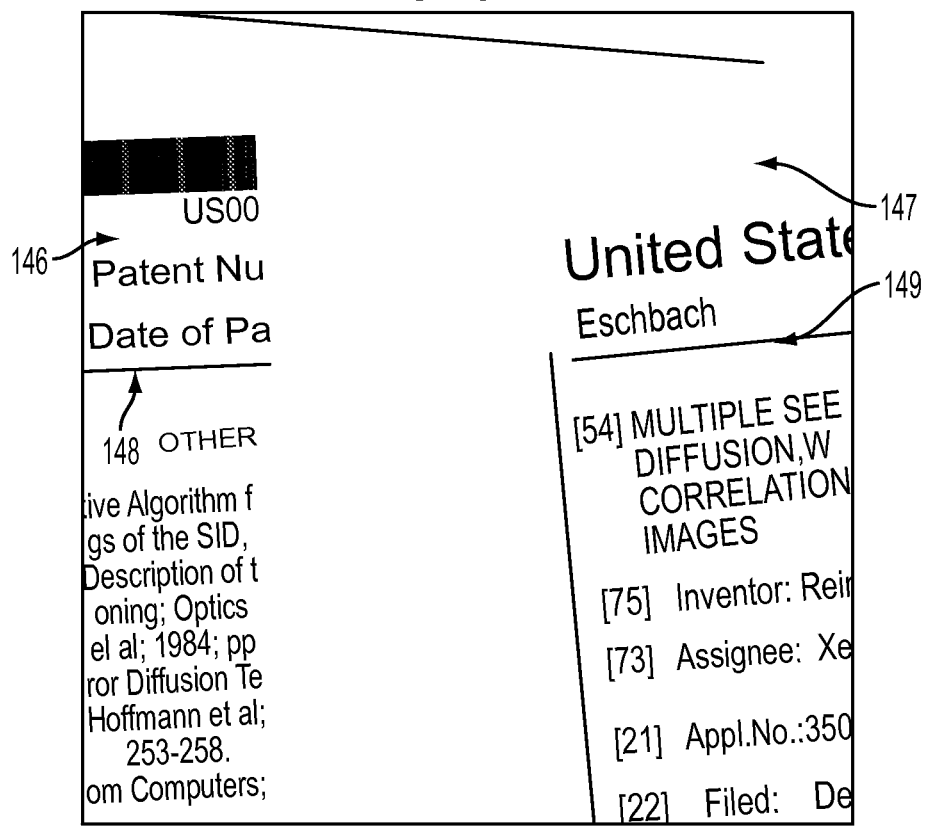
FIG. 7 is a scanned image produced by systems and methods herein.

Any form of microprinting can be utilized with the systems and methods herein (including different sized printing, differential gloss printing, different ink (infrared, ultraviolet, etc.) printing, etc. As is understood by those ordinarily skilled in the art, microprinting involves printing very small text, usually too small to read with the naked eye, onto the item. Microprint is frequently hidden in an inconspicuous, unnoticeable area on the item. The systems and methods herein determine the thickness of the line being erased (e.g., in FIG. 3) and calculate the size of the characters to be utilized in the microprinting to make the characters as undetectable as possible, while at the same time staying within the limits of the equipment available (and to ensure that the microtext will still be discernible). The microtext can be augmented by thin lines 146 to generate the proper lines properties as shown in FIG. 6. Also, FIG. 7 shows an example of an actual altered scan 146, where the microtext line is shown as item 148. More specifically, FIG. 7 shows the original document 147 on the right with the line 149 intact, and the altered scan 146 on the left, with the same "delineating line replaced by" microtext 148.

With systems and methods herein, if a copy of this top-secret research paper 100 were ever discovered as being in the possession of an unauthorized individual or entity, the user who created the original scan, as well as the date and location of where the scanning occurred can be immediately known. The operators of the scanners (and/or their supervisors) can optionally be made aware that this information is being tracked within the output from the scanner (or more technically the image processor) inside the altered scan, which deters scan operators from taking unauthorized possession of scanned images.

Therefore, the systems and methods herein provide a solution for a security issue in a managed services environment. In that environment, deterrence is a large component of security because deterrence strongly reduces negligent behavior, which often is the main cause of data breaches. The systems and methods herein provide a way to unobtrusively modify a "free-form" document by automatically identifying and erasing delineation element document components to later replace the erasures with security elements that encapsulate relevant information, such as time/place/user. In this way, the copy of the original stays fully functional and visually identical under cursory examination, but still allows a tracing back to the person/location that created it.

Figure 8:
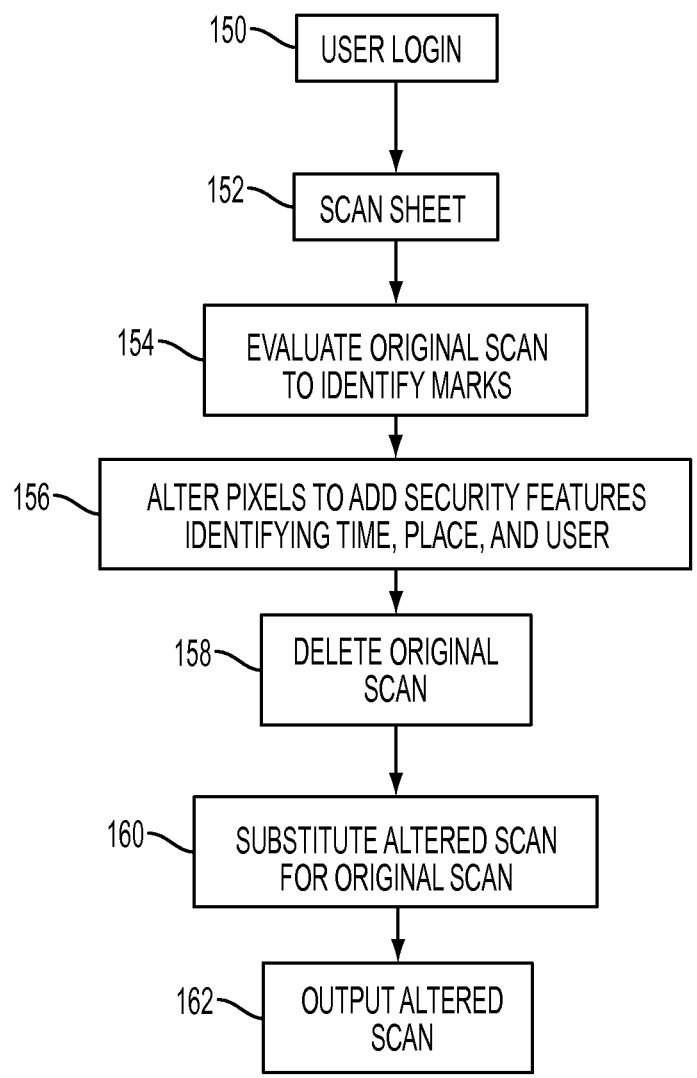
FIG. 8 is a flow diagram of various methods herein.

FIG. 8 is flowchart illustrating exemplary methods herein. In item 150, these methods begin when they receive a user login to a scanner or other pertinent user information and identification. After the user logs in, a previously printed sheet is scanned in item 152 using the scanner to create an original scan. In item 154, such methods evaluate the original scan to identify marks printed on the printed sheet. For example, any marks, such as the straight and curved marks located in separation areas (areas separating data areas of the printed sheet, such as areas separating text, graphics, and/or images) of the original scan can be evaluated using a specialized image processor.

Then, in item 156, these methods alter the pixels of such marks to add security features (e.g., microtext, microprinting, etc.) to the marks that identify the time, place, and operator of the scanner (based on the user login), etc., and this process (that is again performed using the specialized image processor) produces an altered scan. The time, place, and operator of the scanner, etc. within the security features require magnification equipment to be viewed, and are not observable by a user lacking such magnification equipment. Therefore, the process of altering the pixels of the marks does not change the appearance of the marks to the user lacking such magnification equipment.

Rather than outputting the original scan, these methods instead delete the original scan in item 158 and substitute the altered scan in place of the original scan in item 160. Therefore, such methods only output the altered scan from the image processor (in place of the original scan) in item 162. Also, methods herein can store the original scan in a database to be retrieved once a security complaint comes in.

Figure 9:
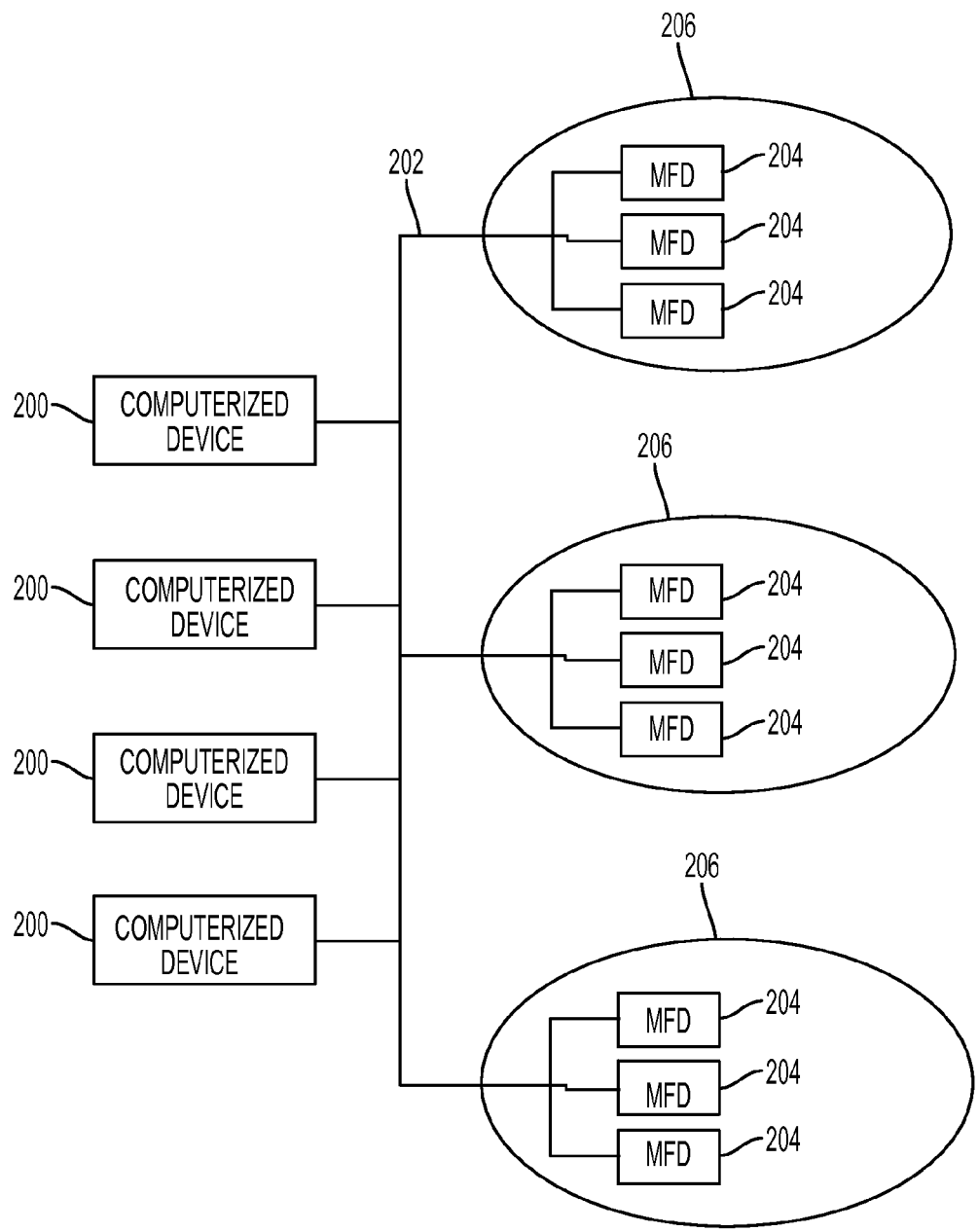
FIG. 9 is a schematic diagram illustrating systems herein.

As shown in FIG. 9, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 10:
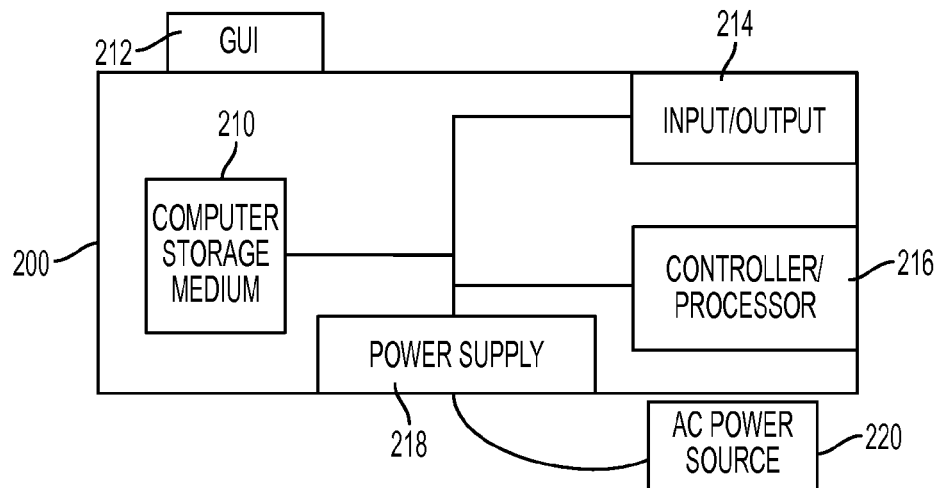
FIG. 10 is a schematic diagram illustrating devices herein.

FIG. 10 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

FIG. 9 illustrates a computerized device that is a printing/scanning device 204, which can be used with systems and methods herein and can comprise, for example, a copier, multi-function machine, multi-function device (MFD), etc. The printing/scanning device 204 includes many of the components mentioned above and can include at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Thus, in printing devices herein a latent image can be developed with developing material to form a toner image corresponding to the latent image. Then, a sheet is fed from a selected paper tray supply to a sheet transport for travel to a transfer station. There, the image is transferred to a print media material, to which it may be permanently fixed by a fusing device. The print media is then transported by the sheet output transport 236 to output trays or a multi-function finishing station 234 performing different desired actions, such as stapling, hole-punching and C or Z-folding, a modular booklet maker, etc., although those ordinarily skilled in the art would understand that the finisher/output tray 234 could comprise any functional unit.

Thus, the system herein include, among other components, a scanner 232 scanning a previously printed sheet to create an original scan, and a specialized image processor 224 operatively (meaning directly or indirectly) connected to the scanner 232. Therefore, the devices herein may include less or more components than those shown in FIG. 9-11, and are not required to include all components that are illustrated because the accompanying drawings only show some examples of how the systems and methods herein could be implemented, and those ordinarily skilled in the art would understand that the devices claimed herein could take many forms.

The specialized image processor 224 evaluates the original scan to identify marks printed on the printed sheet in the separation areas of the printed sheet. The specialized image processor 224 alters pixels of the marks to add security features (identifying the time, place, and user of the scanner 232) to the marks to produce an altered scan. Again, the scanner 232 receives a user login (e.g., into the graphic user interface 212) prior to the scanning, and the specialized image processor 224 uses the user login to add the security features that identify the user of the scanner 232.

The time, place, and user of the scanner 232 within the security features (e.g., microtext, microprinting, etc.) require magnification equipment to be viewed and are not observable by a user lacking the magnification equipment. Thus, again, the process of altering the pixels of the marks does not change the appearance of the marks to the user lacking the magnification equipment.

The specialized image processor 224 deletes the original scan and substitutes the altered scan in place of the original scan. The image processor 224 thus only outputs the altered scan (in place of the original scan).

Figure 11:
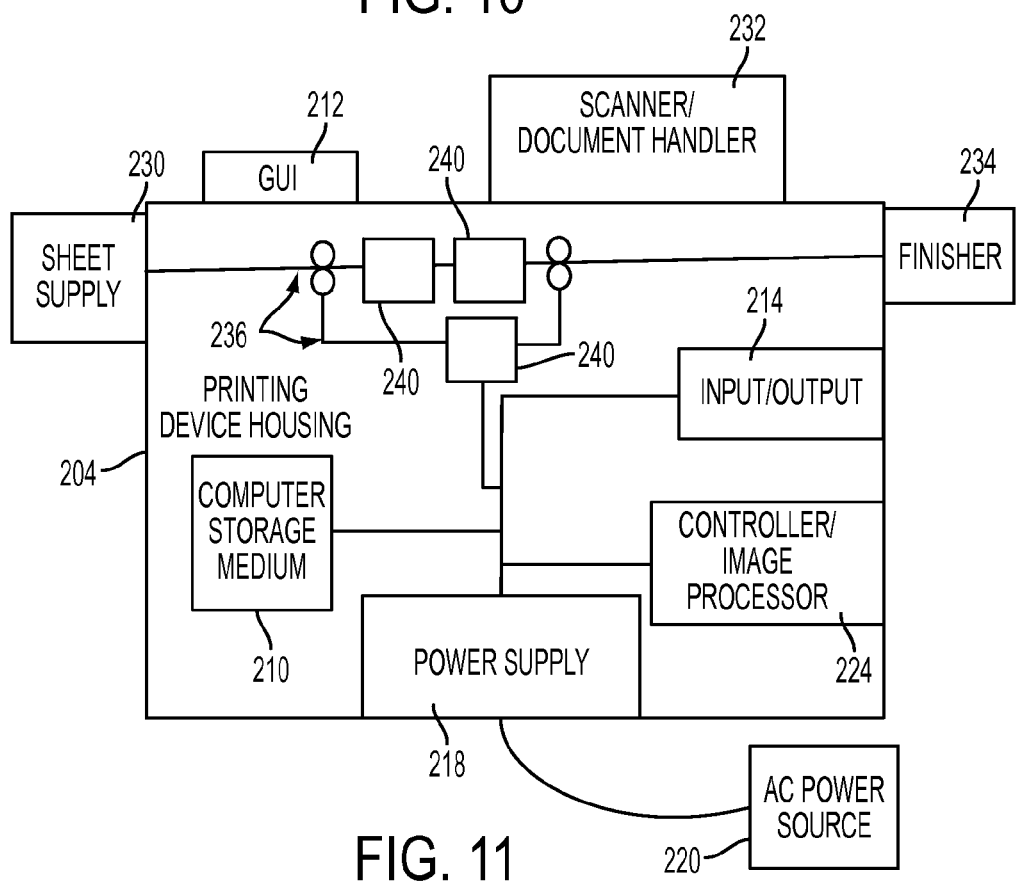
FIG. 11 is a schematic diagram illustrating devices herein.

As would be understood by those ordinarily skilled in the art, the printing/scanning device 204 shown in FIG. 11 is only one example and the systems and methods herein are equally applicable to other types of printing devices that may include fewer components or more components. For example, while printing engines and paper paths are illustrated in FIG. 11, those ordinarily skilled in the art would understand that such components are not utilized in a stand-alone scanner, or many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   scanning, by a user, a previously printed sheet using a scanner to create an original scan;
   automatically evaluating said original scan to automatically identify marks printed on said previously printed sheet using a specialized image processor, without further input from said user;
   automatically altering pixels of said marks to dynamically add security features to different sheet locations for each different scanned sheet, without further input from said user, said security features identifying at least one of time, place, and user of said scanner to said marks to automatically produce an altered scan using said specialized image processor;
   automatically substituting said altered scan in place of said original scan using said specialized image processor, without further input from said user; and
   outputting said altered scan from said image processor in place of said original scan in a manner that said security features in said altered scan are not observable by said user lacking magnification equipment.

2. The method according to claim 1, said at least one of time, place, and user within said security features requiring magnification equipment to be viewed and not being observable by a user lacking said magnification equipment.

3. The method according to claim 2, said altering pixels of said marks not changing an appearance of said marks to said user lacking said magnification equipment.

4. The method according to claim 1, said security features comprising microtext and microprinting.

5. The method according to claim 1, further comprising receiving a user login to said scanner prior to said scanning, said altering pixels comprising using said user login to add said security features identifying said user of said scanner.

6. A method comprising:
   scanning, by a user, a previously printed sheet using a scanner to create an original scan;
   automatically evaluating said original scan to automatically identify marks printed on said previously printed sheet based on which markings of said previously printed sheet are unobtrusively alterable, using a specialized image processor, without further input from said user;
   automatically altering pixels of said marks to dynamically add security features to different sheet locations for each different scanned sheet, without further input from said user, said security features identifying at least one of time, place, and user of said scanner to said marks to automatically produce an altered scan using said specialized image processor;
   automatically substituting said altered scan in place of said original scan using said specialized image processor, without further input from said user; and
   outputting said altered scan from said image processor in place of said original scan in a manner that said security features in said altered scan are not observable by said user lacking magnification equipment.

7. The method according to claim 6, said at least one of time, place, and user of said scanner within said security features requiring magnification equipment to be viewed and not being observable by a user lacking said magnification equipment.

8. The method according to claim 7, said altering pixels of said marks not changing an appearance of said marks to said user lacking said magnification equipment.

9. The method according to claim 6, said security features comprising microtext and microprinting.

10. The method according to claim 6, further comprising receiving a user login to said scanner prior to said scanning,
   said altering pixels comprising using said user login to add said security features identifying said user of said scanner.

11. A system comprising:
   a scanner, operated by a user, scanning a previously printed sheet to create an original scan; and
   a specialized image processor operatively connected to said scanner,
   said specialized image processor automatically evaluating said original scan to automatically identify marks printed on said previously printed sheet, without further input from said user,
   said specialized image processor automatically altering pixels of said marks to dynamically add security features to different sheet locations for each different scanned sheet, without further input from said user, said security features identifying at least one of time, place, and user of said scanner to said marks to automatically produce an altered scan,
   said specialized image processor automatically substituting said altered scan in place of said original scan, without further input from said user, and
   said image processor outputting said altered scan in place of said original scan in a manner that said security features in said altered scan are not observable by said user lacking magnification equipment.

12. The system according to claim 11, said at least one of time, place, and user of said scanner within said security features requiring magnification equipment to be viewed and not being observable by a user lacking said magnification equipment.

13. The system according to claim 12, said altering pixels of said marks not changing an appearance of said marks to said user lacking said magnification equipment.

14. The system according to claim 11, said security features comprising microtext and microprinting.

15. The system according to claim 11, said scanner receiving a user login prior to said scanning and said specialized image processor using said user login to add said security features identifying said user of said scanner.

16. A system comprising:
   a scanner, operated by a user, scanning a previously printed sheet to create an original scan; and
   a specialized image processor operatively connected to said scanner,
   said specialized image processor automatically evaluating said original scan to automatically identify marks printed on said previously printed sheet based on which markings of said previously printed sheet are unobtrusively alterable, without further input from said user,
   said specialized image processor automatically altering pixels of said marks to dynamically add security features to different sheet locations for each different scanned sheet, without further input from said user, said security features identifying at least one of time, place, and user of said scanner to said marks to automatically produce an altered scan,
   said specialized image processor automatically substituting said altered scan in place of said original scan, without further input from said user, and
   said image processor outputting said altered scan in place of said original scan in a manner that said security features in said altered scan are not observable by said user lacking magnification equipment.

17. The system according to claim 16, said at least one of time, place, and user of said scanner within said security features requiring magnification equipment to be viewed and not being observable by a user lacking said magnification equipment.

18. The system according to claim 17, said altering pixels of said marks not changing an appearance of said marks to said user lacking said magnification equipment.

19. The system according to claim 16, said security features comprising microtext and microprinting.

20. The system according to claim 16, said scanner receiving a user login prior to said scanning and said specialized image processor using said user login to add said security features identifying said user of said scanner.

* * * * *